June 20, 1961 C. A. SHOPE 2,988,877
SOLID PROPELLANT ROCKET MOTOR
Filed Dec. 30, 1957 2 Sheets-Sheet 1

INVENTOR.
C.A. SHOPE
BY Hudson & Young
ATTORNEYS

June 20, 1961  C. A. SHOPE  2,988,877
SOLID PROPELLANT ROCKET MOTOR
Filed Dec. 30, 1957  2 Sheets-Sheet 2
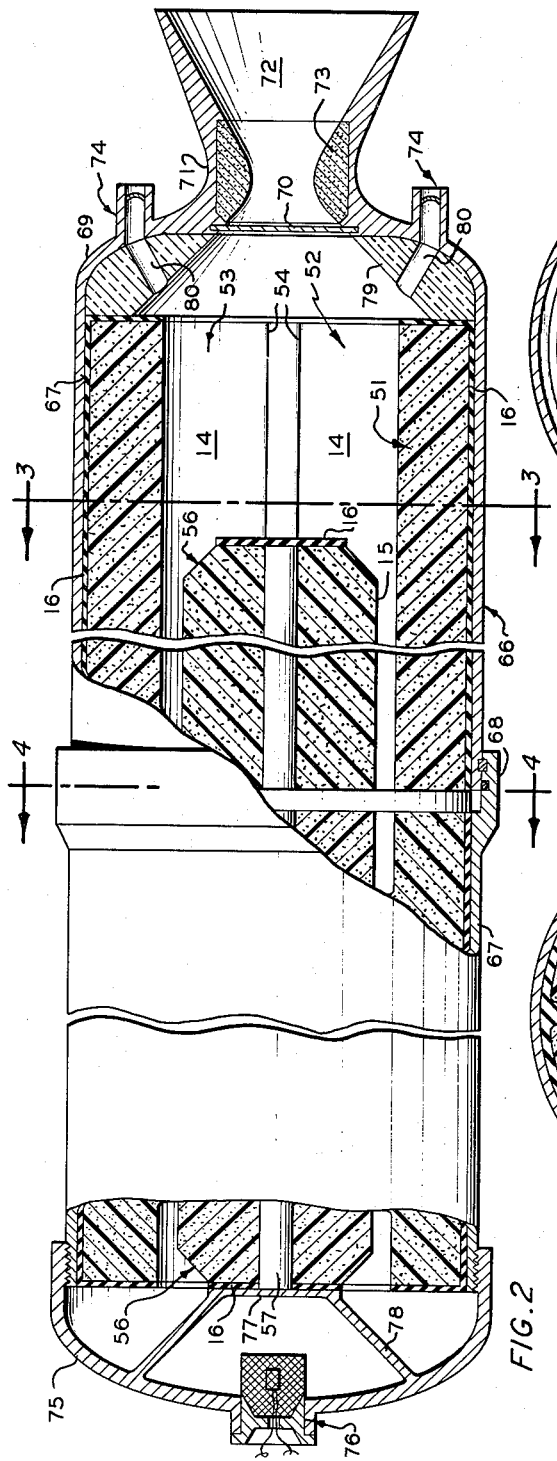
FIG. 2
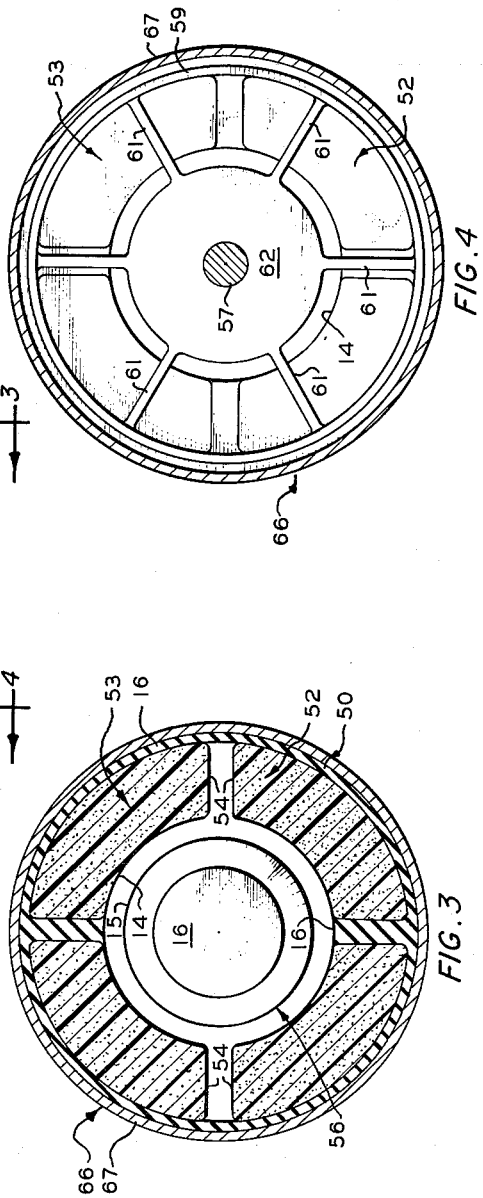
FIG. 4
FIG. 3
INVENTOR.
C. A. SHOPE
BY Hudson & Young
ATTORNEYS United States Patent Office 2,988,877
Patented June 20, 1961

2,988,877
SOLID PROPELLANT ROCKET MOTOR
Claude A. Shope, McGregor, Tex., assignor to Phillips Petroleum Company, a corporation of Delaware
Filed Dec. 30, 1957, Ser. No. 706,210
3 Claims. (Cl. 60—35.6)

This invention relates to a solid propellant rocket motor. In one aspect it relates to a solid propellant charge having a novel configuration or geometry. In another aspect it relates to rocket motors, such as the type used to assist the take-off of aircraft, loaded with a charge of solid propellant having a high volumetric density.

Rocket motors utilizing solid propellants, such as the type with which this invention is concerned, generally comprise a cylindrical casing defining a combustion chamber loaded or charged with solid propellant which upon ignition and burning generates large volumes of gases at high pressures and temperatures. Complete ignition of the propellant in a short time may be attained by rapidly increasing the combustion chamber presure by means of a blow-out or starter disc positioned across a passage in an outlet nozzle located at the rear or aft end of the chamber. Following the functioning of the starter disc, these gaseous products are discharged at high velocities from the chamber via the nozzle passage, thus developing propulsive thrust which propels the rocket motor forward.

Applications of this type of rocket motor include artillery rockets, boosters, missile sustainers, assisting the take-off of aircraft, and non-propulsive systems such as gas generators. The rocket motor of this invention is especially adapted for assisting the take-off of aircraft, rocket motors used for this service being known as JATO units; but it is to be understood that this invention is not to be limited to such service, although this invention will be illustrated as applied thereto.

Accordingly, an object of this invention is to provide a novel solid propellant rocket motor. Another object is to provide a solid propellant charge having a novel geometry and a relatively high volumetric density. Another object is to provide a solid propellant charge designed to generate a substantially constant volume of combustion gases at a controlled rate. Another object is to load a rocket motor with a propellant charge in such a manner as to insulate rocket motor casing and thus reduce the weight of the rocket motor casing. Another object is to support a propellant charge having a relatively high volumetric density in such a manner as to enable forces encountered during operation to be transmitted to novel support means. Another object is to reduce the weight of the rocket motor casing and hardware. Another object is to provide a propellant charge having a novel configuration which lends itself to ready ignition. Another object is to provide a rocket motor designed to permit ease of inspection of a propellant charge loaded therein. Further objects and advantages of this invention will become apparent to those skilled in the art from the following discussion, appended claims, and accompanying drawing in which:

FIGURE 2 is a side elevantional view, in partial section, of a rocket motor, such as the type employed to assist the take-off of aircraft, loaded with the propellant charge of FIGURE 1;

FIGURES 3 and 4 are elevational transverse views of FIGURE 2 taken along the planes indicated;

Figure 1:
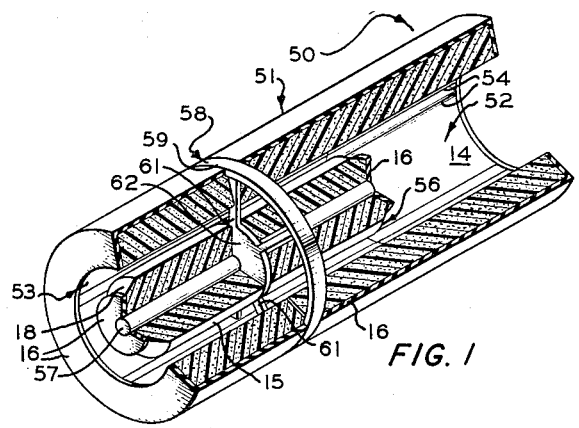
FIGURE 1 is an isometric view, in quarter section, of a propellant charge of this invention.

Referring to charge 50 illustrated in FIGURE 1, outer cylindrical grain 51 comprises four longitudinally aligned circumferentially-spaced quadrants of propellant material such as quadrants 52, 53, alternate adjacent sides of which are spaced so as to define radial burning surfaces 54. Burning surfaces 54 do not extend forward beyond the aft end of rod-like grain 56 of solid propellant longitudinally disposed within the axial perforation in the cylindrical grain 51. The inner surface 14 of grain 51 and the outer surface 15 of grain 56 function as propellant burning surfaces. The outer cylindrical surface and two ends of cylindrical grain 51 are covered with suitable restricting material 16; the outer ends of rod-like grain 56 are similarly covered with restricting material 16. Fabricating the outer cylindrical grain 51 in quadrants allows consumption of the propellant mass of the outer grain between sections. As a result, the pressure of the combustion gases generated by the propellant mass will be substantially constant, and a flat or plateau-shaped thrust-time curve obtained. Note that rod-like grain 56 is shorter than grain 51 (e.g., about ⅔ the length of grain 51) and has an axial perforation through which a bonded suitable rod 57 extends. Grain 56 is chamfered at its head end at 18 to direct the flow of ignition products over the exposed burning surfaces 14, 15 and 54, and is chamfered at its aft end to aid the flow of combustion gases. Grain 56 is longitudinally and spatially aligned by a suitable spider support means 58 having an outer rim 59, spokes 61 and a center plate 62 which has an axial opening through which support rod 57 passes. Where spider means are used to support the inner grain, charge 50 can be made by fabricating both the inner grain 56 and the outer grain 51 in longitudinal sections which are joined together at that point where the spider means radially bisects the charge.

Referring now to FIGURES 2 to 4, a rocket motor 66 is illustrated having a two-part casing 67 which telescopes together and is secured by suitable flange 68 or the like, together with suitable keys and sealing rings. The aft end of casing 67 is reduced at 69 and is provided with an integral reaction nozzle portion 71. Nozzle 71 has a converging-diverging passage 72, the inner constricted portion of which can be defined by a suitable carbon sleeve-like insert 73 or the like. A starter disc 70, made of Plexiglas or the like, is positioned across passage 72 just ahead of carbon insert 73. This disc 70 can be secured in any desirable manner and is adapted to rupture when the pressure in the combustion chamber reaches a predetermined pressure. Reduced casing portion 69 can be provided with one or more safety excess pressure means 74. The propellant charge 50 of FIGURE 1 is loaded within the combustion chamber of rocket motor 66, the outer cylindrical grain 51 being case-bonded to the inner wall of casing 67, in the manner described hereinbefore. The head end of the casing 67 is closed by closure member 75 which has an axial opening in which is positioned a suitable igniter 76, such as a confined mesh container containing carbon black or other pyrotechnic material, etc. In this rocket motor, the ignition material described and claimed in also copending application Serial No. 592,995, filed June 21, 1956, of L. G. Herring is also preferred. The head end of rod grain 56 is provided with a suitable retaining plate 77 which is secured to rod 57 and to suitable retaining legs 78 or the like, the latter being secured to the closure member 75. The aft end of the combustion chamber is provided with suitable insulation 79, such as Insulag, a phenolic resin filled with asbestos shorts or Fiberglas, or the like, provided with passages 80 which lead to excess pressure relief means 74.

In the operation of the rocket motor illustrated in

FIGURE 2, igniter 76 is initiated upon closing a suitable switch in an electrical circuit whereupon the igniter material is ignited and burns, the resulting igniter decomposition products propagating preferentially down through the annular space between grains 51 and 56, and down between the alternate longitudinal and radial spaces between the quadrant sections 52, 53, thereby igniting burning surfaces 14, 15 and 54. The resulting production of hot combustion gases raises the pressure within the combustion chamber of the rocket motor, the carbon insert 73 preventing erosion, thereby permitting the rapid escape of combustion gases through passage 72 after the pressure reaches a blow-out or starter disc bursting pressure, e.g., 200 p.s.i., and bursts or otherwise ruptures starter disc 70, thereby imparting thrust to the rocket motor. Should the pressure within the combustion chamber of the rocket motor exceed a predetermined safety pressure, one or more of the excess pressure relief discs in safety device 74 ruptures, allowing a reduction in pressure in the combustion chamber.

The propellant charge geometry illustrated in the rocket motor of FIGURE 2 permits a high volumetric loading of propellant material without sacrificing exposed burning surface area. In addition, since the propellant mass is remote from the nozzle passage 72, there will be little tendency for the high velocity gas flow to cause uncontrolled burning. Fabricating the outer cylindrical grain 51 in sections not only permits one to obtain a constant pressure when the charge geometry of FIGURE 2 is employed, but fabricating the outer cylindrical grain in this manner can be more readily performed with available extrusion equipment since these cylindrical grains may have an outer diameter of a foot-and-a-half, or larger.

Figure 5:
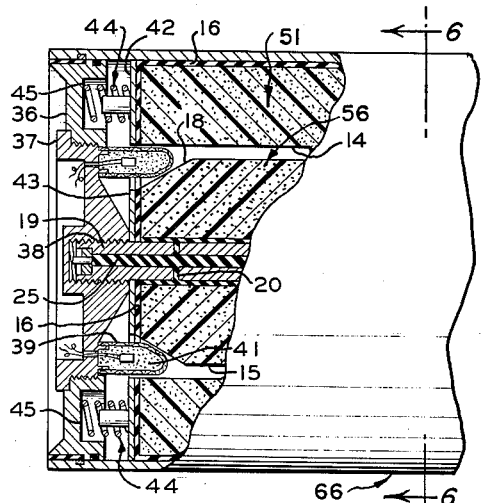
FIGURE 5 is a side elevational view of a portion of another rocket motor, like that of FIGURE 2, provided with certain modifications thereof.
Figure 6:
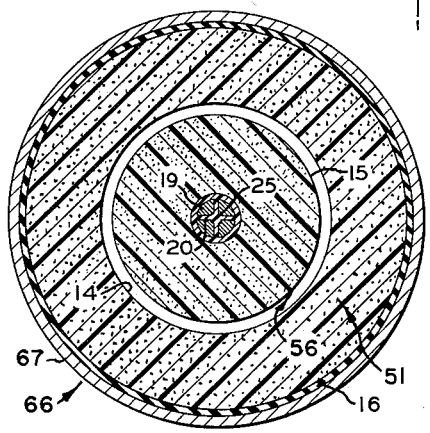
FIGURE 6 is an elevational transverse view of FIGURE 5 taken along the plane indicated.

Referring to FIGURES 5 and 6, alternative head closure, igniter means, and support rod are shown. Rod grain 56 has an axial perforation in which is disposed a support rod 19, the ends of which protrude from the ends of grain 56. The head of rod 19 is threaded while the aft end thereof preferably is tapered. Rod 19 is securely bonded within the axial perforation in rod grain 56. This bonding is accomplished by injecting a suitable bonding agent or cement into an axial bore 25 within rod 19, allowing the cement to penetrate through radial holes 20 in rod 19 and flow between the outer cylindrical surface of rod 19 and the propellant of rod grain 56 defining its axial perforation. Any extruding device such as a plunger-cylindrical pressure gun can be used to inject a bonding agent into the axial bore 25. Suitable bonding agents include GRS-plasticizer-tackifier formulations, butadiene-methylvinylpyridine-plasticizer-tackifier formulations, natural rubber-solvent formulations, and various commercial rubber type bonding agents.

The head end of casing 67 is provided with an annular closure member 36, the periphery of which is secured within casing 67 by means of suitable keys, sealing rings, or the like, which can be readily disassembled to aid inspection of the interior of the rocket motor. Closure member 37 is provided with axial threaded passage 38 adapted to receive the threaded end of rod 19, the latter acting substantially as a cantilever in supporting grain 56. An annular or doughnut-like igniter 39 is secured to the periphery of the inner face of closing means 37.

The igniter 39 is preferably a wire container shaped in the form of a doughnut, the mesh openings being covered with a rubbery or plastic material which will melt or burn, or otherwise rupture. The igniter 39 contains suitable ignition material 41, such as black powder or other pyrotechnic material. Preferably, ignition material 41 is in granular or pelleted form, comprising discreet particles of powdered metal, powdered oxidizing material and ethylcellulose (which acts as a binding agent), such igniter material being disclosed and claimed in said copending application Serial No. 592,995. The inner end of igniter 39 extends into the space between the chamfered end 18 of rod grain 56 and the adjacent head portion of cylindrical grain 51, igniter 39 being shaped to conform to said space. Embedded in the igniter material 41 is one or more electro-responsive means, such as squibs, matches or the like, having suitable electric lead wires extending through suitable insulation in closing means 37. The head end of grain 51 abuts an annular charge retaining plate 42, while the head end of rod-like grain 56 abuts a disc-like retaining plate 43. Plates 42 and 43 can be bonded by any suitable means (e.g., adhesive) to their adjacent grains. Plate 42 is provided with one or more spring-like retaining means 44 which are positioned within suitable wells 45 in the inner face of closure member 36.

The operation of the rocket motor illustrated in FIGURES 5 and 6 is essentially the same as that described hereinbefore with regard to that of FIGURE 2, the ignition of igniter material 41 given rise to decomposition products which melt or otherwise rupture the coating on the igniter container 39 to allow the decomposition products to flow through the openings in the container to the annular space between grain 51 and 56, so as to ignite burning surfaces 14, 15 and 54. The position of igniter 39 insures quick and uniform ignition. Supporting rod grain 56 in the manner illustrated enables the rocket motor designer to decrease the weight of the head end of the rocket motor. At the same time, operational forces acting upon the propellant mass of rod-like grain 56 are transmitted to the support rod 19 in such a manner as to minimize cracking or fracturing of the propellant mass due to these forces. The interior of the rocket motor can be readily inspected since the head closing means 37 can be disassembled and removed.

The solid propellants for which the rocket motor of our invention is particularly adapted are composite-type propellants comprising a fuel or binder and an oxidizer for oxidizing the fuel, although any type of solid propellant can be used. Particularly useful propellant compositions which may be utilized in the practice of this invention are of the rubbery copolymer-oxidizer type which is plasticized and worked to prepare an extrudable mass at 130° to 175° F. The rubbery copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the extruded grains of propellant at temperatures preferably in the range of 170° to 185° F. In addition to the copolymer binder and oxidizer, the propellant composition comprises a burning rate catalyst and other known ingredients.

Solid propellant compositions particularly useful in the preparation of the propellant charges used in this invention are those disclosed and claimed in the copending U.S. application, Serial No. 284,447, filed April 25, 1952 by W. B. Reynolds and J. E. Pritchard. These propellant compositions are prepared by mixing the rubbery copolymer with a solid oxidizer, a burning rate catalyst, and various other compounding ingredients so that the reinforced binder forms a continuous phase and the oxidizer a discontinuous phase. The resulting mixture is heated to effect curing of the same.

The copolymers employed as rubbery binders are preferably formed by copolymerization of a vinyl heterocyclic nitrogen compound with an open chain conjugated diene. The conjugated dienes preferably employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-5-vinylpyridine, and the like. The corresponding compounds in which an alpha-methylvinyl (isopropenyl) group replaces the vinyl group are also applicable.

In the preparation of the copolymers, the amount of conjugated diene employed can be in the range between 75 and 95 parts by weight per 100 parts monomers and the vinyl heterocyclic nitrogen can be in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10–40, preferably in the range of 15 to 25, and may be masterbatched with 5–20 parts of Philblack A, a furnace black, per 100 parts of rubber. Masterbatching refers to the method of adding carbon black to the latex before coagulation and coagulating to form a high degree of dispersion of the carbon black in the rubber. In order to facilitate dispersion of the carbon black in the latex Marasperse–CB, or similar surface active agent, can be added to the carbon black slurry or to the water used to prepare the slurry.

The following empirical formulation or recipe generally represents the class of propellant compositions preferred for the preparation of the propellant used for fabricating the grains of this invention:

Table I

| Ingredient | Parts Per 100 Parts of Rubber | Parts by Weight |
|---|---|---|
| Binder: | | |
| Copolymer (Bd/MVP) | 100 | 10–25 |
| Philblack A (a furnace black) | 10–30 | |
| Plasticizer | 10–30 | |
| Silica | 0–20 | |
| Metal Oxide | 0–5 | |
| Antioxidant | 0–5 | |
| Wetting Agent | 0–2 | |
| Accelerator | 0–2 | |
| Sulfur | 0–2 | |
| Oxidizer (Ammonium Nitrate) | | 75–90 |
| Burning Rate Catalyst | | 0–30 |

Suitable plasticizers useful in preparing these propellants include TP–90–B (dibutoxyethoxyethyl formal supplies by Thiokol Corp.); benzophenone; and Pentaryl A (monoamylbiphenyl). Suitable silica preparations include a 10–20 micron size range suppled by Davison Chem. Co.; and Hi-Sil 202, a rubber grade material supplied by Columbia-Southern Chem. Corp. A suitable anti-oxidant is Flexamine, a physical mixture containing 25 percent of a complex diarylamine-ketone reaction product and 35 percent of N,N'-diphenyl-p-phenylenediamine, supplied by Naugatuck Chem. Corp. A suitable wetting agent is Aerosol–OT (dioctyl sodium sulfosuccinate, supplied by American Cyanamid Co.). Satisfactory rubber cure accelerators include Philcure 113 (SA–113 N,N-dimethyl-S-tertiary butylsulfenyl dithiocarbamate); Butyl-8 (a dithiocarbamate-type rubber accelerator supplied by R. T. Vanderbilt Co.); and GMF (quinone dioxime, supplied by Naugatuck Chem. Co.). Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like, can also be used.

The restricting material can be made from any of the slow burning materials used for this purpose in the art, such as cellulose acetate, ethylcellulose, butadiene-methylvinylpyridine copolymer, GR–S, natural rubber, and the like. A particularly useful restrictor can be made from a mixture of a butadiene-methylvinylpyridine copolymer and Neoprene, using as a bonding agent a cement made principally of polyurethane synthetic material.

Various modifications and alternatives of our invention will become apparent to those skilled in the art; and it is to be understood that the foregoing discussion and drawing merely illustrate preferred embodiments of my invention and do not necessarily limit the same.

I claim:

1. In a rocket motor comprising a tubular casing defining a cylindrical combustion chamber, and a reaction nozzle adapted to permit the discharge of gaseous products from said chamber, a solid propellant charge loaded in said chamber comprising: a cylindrical grain of solid propellant having an outer cylindrical surface bonded to the inner wall of said casing and an axial perforation defined by an internal exposed first burning surface, said cylindrical grain comprising a plurality of longitudinal sections with at least two of said sections being circumferentially spaced to provide radial second exposed burning surfaces, a rod of solid propellant longitudinally disposed within said axial perforation and spaced from said first burning surface, said rod having an external third burning surface, the head end of said rod being chamfered, support means axially extending through said rod and adapted to spatially support said rod within said chamber, said rod being shorter than said cylindrical grain and remote from said reaction nozzle, and an igniter positioned in the head end of said chamber.

2. In a rocket motor comprising a tubular casing defining a cylindrical combustion chamber, and a reaction nozzle adapted to permit the discharge of gaseous products from said chamber, a solid propellant charge loaded in said chamber comprising: a cylindrical grain of solid propellant having an outer cylindrical surface bonded to the inner wall of said casing and an axial perforation defined by an internal exposed first burning surface, said cylindrical grain comprising a plurality of longitudinal sections with at least two of said sections being circumferentially spaced to provide radial second exposed burning surfaces, a rod of solid propellant longitudinally disposed within said axial perforation and spaced from said first burning surface, said rod having an external third burning surface, support means axially extending through said rod and adapted to spatially support said rod within said chamber, said rod being shorter than said cylindrical grain and remote from said reaction nozzle, the head end of said rod being chamfered, and an annular igniter secured to the head end of said casing and extending into said chamber between the said chamfered end of said rod and the adjacent head end of said cylindrical grain.

3. A rocket motor comprising a tubular casing defining a cylindrical combustion chamber, a reaction nozzle secured to the aft end of said casing, said nozzle having an inner sleeve-like carbon insert defining a converging-diverging passage communicating with said chamber, a solid propellant charge loaded in said chamber, said charge comprising a cylindrical grain and a rod-like grain of solid propellant, said cylindrical grain having its outer cylindrical surface bonded to the inner wall of said casing and an axial perforation defined by an internal exposed first burning surface, said cylindrical grain comprising circumferentially spaced longitudinal quadrants of propellant with longitudinal and radial alternate spaces between said sections defined by exposed second burning surfaces, said rod-like grain being longitudinally disposed within said axial perforation and spaced from said first burning surface, said rod-like grain having an external cylindrical exposed third burning surface, the ends of said rod-like grain being chamfered and forming part of said third burning surface, the ends of said grains being covered with burning restricting material, said rod-like grain being shorter than said cylindrical grain with the aft end of said rod-like grain being remote from said nozzle passage, spider means secured to the inner wall of said casing and radially extending through the propellant material of said grains to support said rod-like grain at a point intermediate its ends, a support rod axially extending through said rod-like grain and bonded thereto, said support rod being supported in part by said spider means, retaining means in the head end of said chamber secured to the head ends of said casing and rod-like grain and adapted to retain said rod-like grain in its axial position, and an igniter secured to the head end of said casing and extending into said chamber.

References Cited in the file of this patent

UNITED STATES PATENTS

| | | |
|---|---|---|
| 199,723 | Laidley | Jan. 29, 1878 |
| 2,724,237 | Hickman | Nov. 22, 1955 |
| 2,755,620 | Gillot | July 24, 1956 |
| 2,780,996 | Hirsch et al. | Feb. 12, 1957 |

OTHER REFERENCES

"Jet Propulsion," Feb. 1956, vol. 26, No. 2, pp. 102 to 105. Published by the American Rocket Society.

UNITED STATES PATENT OFFICE
CERTIFICATE OF CORRECTION

Patent No. 2,988,877            June 20, 1961

Claude A. Shope

It is hereby certified that error appears in the above numbered patent requiring correction and that the said Letters Patent should read as corrected below.

Column 6, line 49, after "surface," insert -- the head end of said rod being chamfered,--.

Signed and sealed this 28th day of November 1961.

(SEAL)

Attest:

ERNEST W. SWIDER  
Attesting Officer

DAVID L. LADD  
Commissioner of Patents

USCOMM-DC